United States Patent [19]

Wacyk et al.

[11] Patent Number: 4,472,805
[45] Date of Patent: Sep. 18, 1984

[54] MEMORY SYSTEM WITH ERROR STORAGE

[75] Inventors: Ihor T. Wacyk; Andrew G. F. Dingwall, both of Bridgewater; Roger G. Stewart, Neshanic Station, all of N.J.

[73] Assignee: RCA Corporation, New York, N.Y.

[21] Appl. No.: 362,464

[22] Filed: Mar. 26, 1982

[51] Int. Cl.³ .......................................... G06F 11/10
[52] U.S. Cl. .................................................. 371/51
[58] Field of Search ........................... 371/51, 49, 50

[56] References Cited

U.S. PATENT DOCUMENTS

| | | | |
|---|---|---|---|
| 3,972,033 | 7/1976 | Cislaghi et al. | 371/51 X |
| 4,038,537 | 7/1977 | Cassarino, Jr. et al. | 371/51 |
| 4,044,328 | 8/1977 | Herff | 371/50 |
| 4,360,917 | 11/1982 | Sindelar et al. | 371/49 |

Primary Examiner—Charles E. Atkinson
Attorney, Agent, or Firm—Joseph S. Tripoli; George E. Haas; Henry I. Schanzer

[57] ABSTRACT

A memory system stores bits which are read-out internally a word at a time and from which one or more bits may be selected for external read-out. Each time a bit is written into the memory the parity of the word into which the bit is written is checked and a parity bit generated and stored for the word. The parity of the words originally read internally from the memory is checked and any parity errors detected are stored as error signals. Each time a word subsequently is read internally from the memory, if there is stored for that word an error signal, and if it is also determined that the bit selected from that word for external read-out is in error, that bit automatically is corrected even if the parity of the word is found to be correct.

11 Claims, 6 Drawing Figures

MEMORY SYSTEM WITH ERROR STORAGE

The Government has rights in this invention pursuant to Contract No. DAAK 20-79-C-0276 awarded by the Department of the Army.

This invention relates to memory systems and particularly to the detection and correction of errors in such systems.

In a related patent application titled MEMORY SYSTEM WITH ERROR DETECTION AND CORRECTION, bearing Ser. No. 362,463 concurrently filed with the present application and assigned to the same assignee as the present application, a memory system is described which includes a memory array for storing groups of data bits, call them "words", and parity bits for these words. This system includes means for reading from the array a selected word and its parity bit and for indicating whether there is a parity error. The system also includes means for reading one or more, but less than all, of the bits of a word and for writing one or more, but less then all, of the bits of a word at a time. Also, in this system a word may be read containing an error but the error in the word may not be corrected prior to, or during, a following write cycle. Writing a new bit or bits, but less than all, into a word which previously contained an error gives rise to a serious problem. For example, when a new data bit is written into a 32 bit wide word, a new parity bit is concurrently generated based on the status of the one "new" data bit and the 31 "old" (stored) data bits. The previous parity bit is erased and replaced with a parity bit determined by the current state of the 32 bits, which the new parity will affirm to be correct. Hence, a fundamental problem exists since the information represented by the 31 old data bits may still contain an error which will be masked. Thus, the system does not reliably indicate the level of error for a word in which a bit has previously failed. That is, even though it is known that the "old" word selected contained an error and the new one stored still contains that error, the new parity bit will indicate that the parity of the new word is correct.

In a memory system embodying the invention which includes a memory array and means for detecting parity errors in selected words read from the array, means are provided for storing signals indicative of such errors. When during a write cycle a new bit is written into a selected word and the parity bit of the word is updated to indicate correct parity for the word the stored error signal indicates that there is an error in the word even though its parity is correct.

In the accompanying drawing like reference characters denote like components.

Figure 1A:
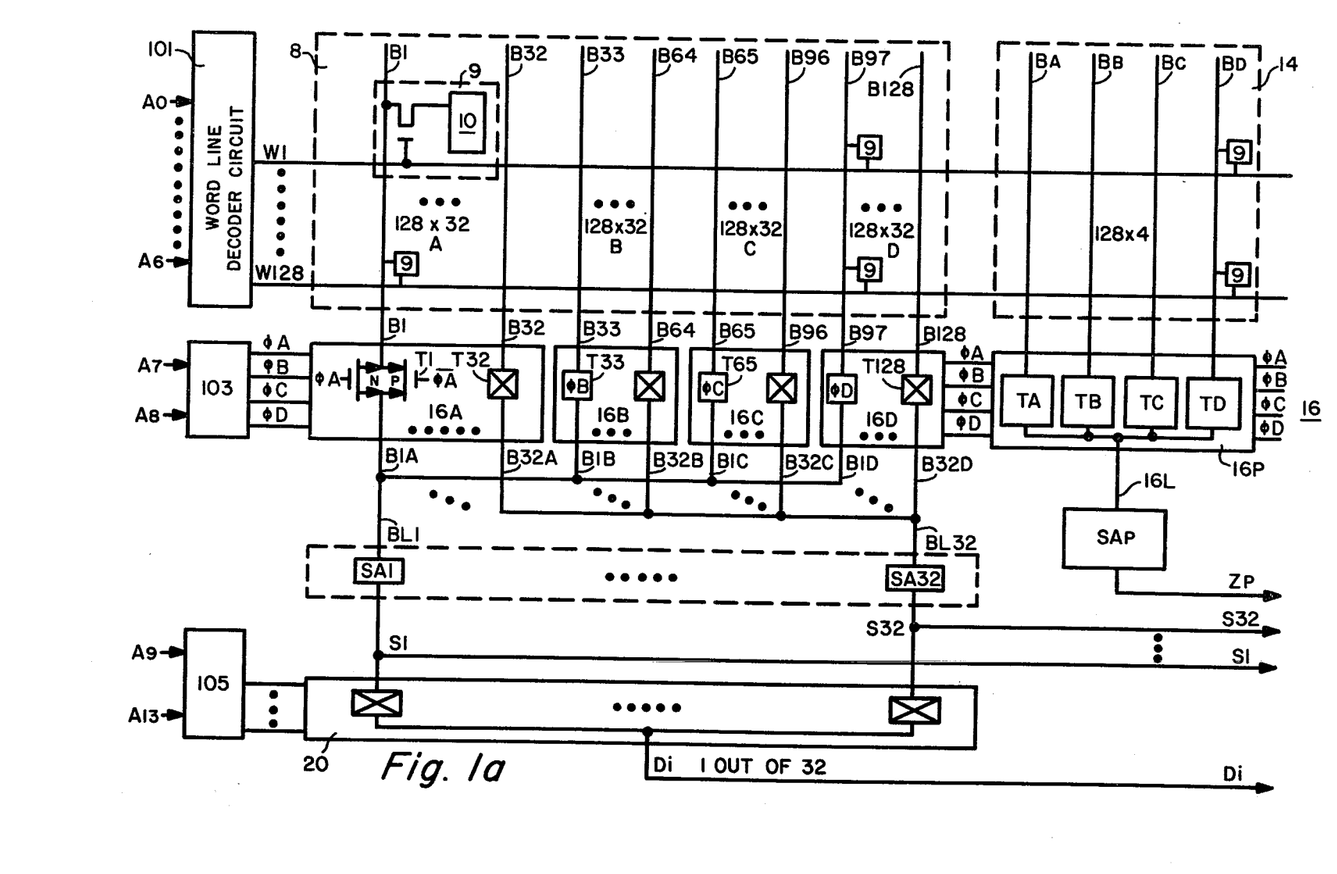
FIGS. 1a, 1b, and 1c are diagrams of portions of a memory system embodying the invention.
Figure 1B:
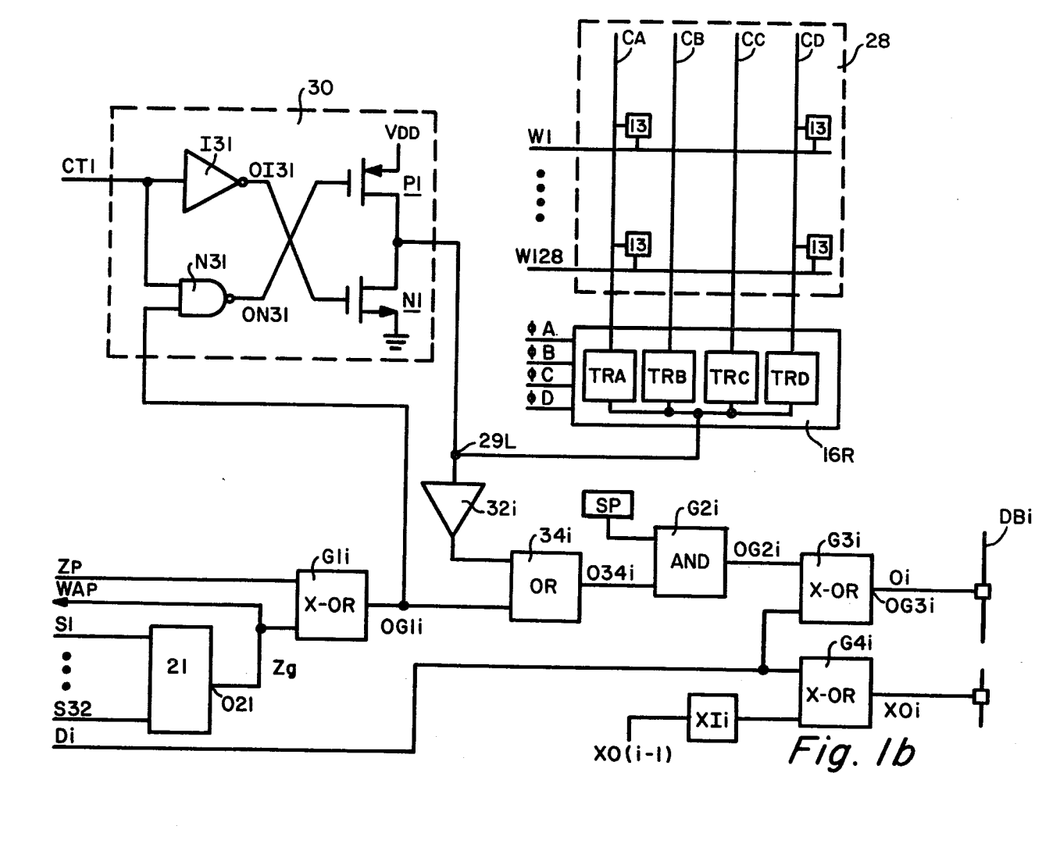
Figure 1C:
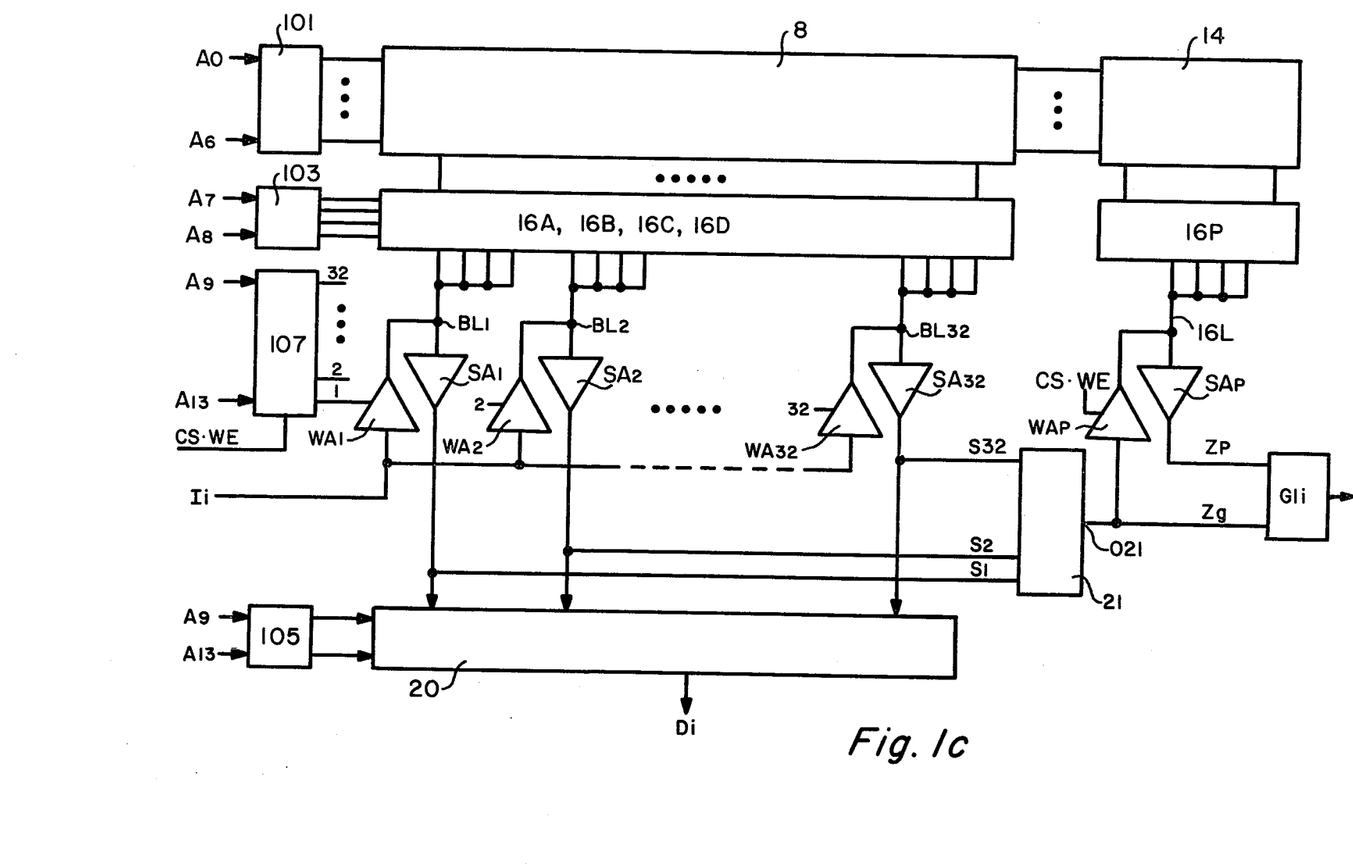
Figure 2:
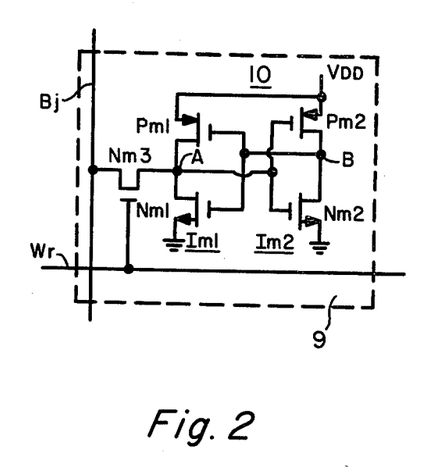
FIGS. 2 is a schematic diagram of a memory cell which can be used to practice the invention.

The operation of the memory system is best explained by first examining FIGS. 1a, 1b, and 1c which detail part of the contents of a module which may be interconnected with other like modules to form a large memory system. Each module or subsystem may be formed on a single integrated circuit (IC), and includes:

(1) A Random Access Memory (RAM) array 8 (as shown in FIG. 1a) comprised of 16,384 memory cells 9 arranged in 128 rows (words) and 128 columns (bits). There is a word line (Wr) per row of cells and a bit conductor (Bj) per column of cells. Each row of array 8 is partitioned into 4 "internal" words or sections, respectively designated A, B, C, and D, of 32 bits (columns). So organized, array 8 is effectively partitioned into 512 (i.e. 128×4) "internal" words of 32 bits each. In array 8, each memory cell 9, as shown in FIG. 2 includes a gating transistor Nm3 whose conduction path is connected between a bit conductor (Bj) and the Input-Output (I/O) point (A) of a flip-flop 10 comprised of two cross coupled complementary inverters Im1 and IM2. Each one of inverters Im1 and Im2 includes two IGFETs of complementary conductivity type having their source drains paths connected in series between $V_{DD}$ and ground. The drains of IGFETs Pm1 and Nm1 forming inverter Im1, are connected in common with the gates of IGFETs Pm2 and Nm2 to I/O point A also defined as the "exterior" node of the cell. The drains of Pm2 and Nm2, forming inverter I2, are connected to the gates of Pm1 and Nm1 at node B also defined as the "interior" node of the cell. A word line (Wr) is connected to the control (gate) electrodes of all the Nm3 transistors of a row. A potential applied to the word line controls the conductivity of Nm3. The drain/source electrodes of all the Nm3 transistors in a column are connected to the bit conductor (Bj) of the column. Cell 9 is a static cell but it should be evident that a dynamic cell, a non-volatile cell or any other suitable memory cell could be used instead.

(2) A parity array 14 (as shown in FIG. 1a) having 512 bit locations at which are found memory or storage elements which may be of the same type as those in array 8 or which may be any other suitable data storage devices. Each bit location of array 14 stores a parity bit corresponding to an "internal" 32-bit word of array 8. Array 14 is arranged in 128 rows and 4 columns, the elements of each row of array 14 being connected to a row (word line) conductor connected to a corresponding word line conductor of array 8, and the elements of each column of elements being connected to a column (bit) conductor, $B_A$, $B_B$, $B_C$, and $B_D$. Each bit conductor of array 14 corresponds to a like lettered section in array 8.

(3) A latching array 28 as shown in FIG. 1b which may be similar to parity array 14 and like array 14 includes 512 bit locations, one location for each internal word of array 8. A storage or memory element 13 is located at each bit location of array 28. The elements 13 may be of the same type as those in array 8 and 14 and may be set to the "0" or "1" condition. In the discussion to follow it is arbitrarily assumed that an element 13 in a given location of array 28 set to "0" indicates no parity error in array 8 corresponding to that bit location, whereas if the element is set to "1" it indicates a parity error in the corresponding internal word of array 8. An element 13, once written to the binary "1" state, permanently stores that condition until a system erase condition is established. The "permanent" storage can be achieved in any one of a number of ways as, for example, by the choice of cell used in array 28 or by the mode of writing information into the cells.

The elements of array 28 are arranged in 128 rows and 4 columns. The elements 13 of each row of array 28 are connected to a row (word line) conductor connected to a corresponding word line conductor of arrays 8 and 14 and the elements of each column are connected to a corresponding column (bit) conductor, $C_A$, $C_B$, $C_C$, and $C_D$. Each bit conductor of array 28 corresponds, to a like lettered section in arrays 8 and 14.

(4) A word line decoder 101 (as shown in FIG. 4 1a) to which 7 address bits ($A_0$ to $A_6$) are applied is coupled to the row conductors of arrays 8, 14 and 28. In response to address bits $A_0$ through $A_6$ decoder 101 enables one row, at a time, of the 128 rows of arrays 8, 14 and 28.

(5) An internal word and parity bit selector 16, comprised of sections 16A, 16B, 16C, 16D, 16P and 16R, is coupled to arrays 8, 14 and 28 for selecting a paritcular "internal" word and its corresponding parity bit. Selector 16 is controlled by an internal word predecoder 103 to which two (2) address bits ($A_7$ and $A_8$) are applied. The two address bits ($A_7$ and $A_8$) determine which one of the four sections (i.e. which group of 32 bits) of array 8 and which column conductor of arrays 14 and 28 is respectively coupled to the thirty-two bit lines (BLj), onto parity line 16L, and onto line 29L. Selector 16 includes one transmission gate per bit conductor in arrays 8, 14, and 28. Selector 16 is partitioned so that corresponding to each section (A, B, C, D) of array 8 there is a coresponding section (16A, 16B, 16C and 16D). Under the control of address bits $A_7$ and $A_8$ and decoder 103 only one of sections A, B, C, and D is turned-on at any one time, whereby only 32 (one section) of the 128 bit conductors of array 8 are coupled, at any one time, via transmission gates to the 32 bit lines (BL1 through BL32). Similarly, the 4 bit conductors of parity array 14 are multiplexed via corresponding transmission gates $T_A$, $T_B$, $T_C$ and $T_D$ in section 16P onto parity line 16L. Only one of $T_A$, $T_B$, $T_C$ and $T_D$ is turned-on at any one time, being turned-on only when its corresponding like lettered group 16A, 16B, 16C or 16D is turned-on. The signal on line 16L is applied via an amplifier $SA_P$ to one imput of a two-input Exclusive-OR gate G1i. Thus, when a 32 bit word is read-out of array 8 onto bit lines BL1 through BL32, a parity bit (Zp) stored in array 14 corresponding to that word is read-out onto line 16L and applied to G1i. Similarly, the 4 bit conductors of latch array 28 are multiplexed via corresponding transmission gates TRA, TRB, TRC and TRD in section 16R onto latch line 29L. Only one of TRA, TRB, TRC and TRD is turned-on at any one time, being turned-on only when its corresponding like lettered group 16A, 16B, 16C or 16D is turned-on. The signal on line 29L is applied via an amplifier 32i to one input of a two-input OR gate 34i. Thus, when a 32 bit word is read-out of array 8 into bit lines BL1 through BL32, a signal stored in array 28 corresponding to that word is read-out onto line 29L and applied via an amplifier 32i to OR gate 34i.

(6) 32 sense amplifiers and latches (SAj) coupled to the bit lines for amplifying the 32 bits of a selected "internal" 32 bit word. The signals on bit lines BLj are amplified by their corresponding sense amplifiers SAj to produce well defined binary levels at their Sj outputs. That is, either a "low" level is produced, where the low level is a voltage at or close to ground potential which is arbitrarily defined as logic "0" or "0"; or a "high" level is produced, where the high level is a voltage at or close to $V_{DD}$ volts which is arbitrarily defined as logic "1" or "1", and where $V_{DD}$ is assumed positive with respect to ground.

(7) A bit decoder 20 is coupled between the Sj outputs and a data bit output for selecting a single "raw" data bit (Di) out of a selected "internal" 32-bit word and producing the "raw" data bit output (Di). Output Di is denoted herein as "raw" because it is coupled to error correction circuitry (G3i) before being applied to the chip output (Oi) from which it is coupled via its duct bus (DBi) to a a microprocessor (not shown) or other data handling systems "external" to the memory chip.

(8) A bit predecoder 105 to which are applied 5 address bits ($A_9$ to $A_{13}$) is coupled to decoder 20 and controls bit decoder 20 to select a particular data bit out of the 32 bit "internal" word.

(9) A logic section for parity generation, error detection, and error correction, is shown in FIG. 1b. The logic section includes a parity generator 21 having 32 inputs to which are applied the 32 Sj signals. Therefore the 32 bits of a selected internal word are applied, after amplification, to generator 21 which has an output (O21) at which is produced a signal Zg which represents the parity of the 32 bit "internal" word. The output Zg of generator 21 and the corresponding parity bit Zp derived from the output of the internal word parity selector 16P are applied to the two inputs of gate G1i. The elements 21 and X-OR gate G1i together comprise a parity checker. The output (OG1i) of G1i (which when it is equal to a "1" indicates a parity error) is applied to the other input of OR gate 34i. The output O34i of gate 34i and an externally generated system error indicator (SP) signal are applied to the two inputs of an AND gate G2i. The output (OG2i) of gate G2i and the "raw" Di output are applied to the inputs of a two-input Exclusive-OR gate G3i whose output (Oi) is the "corrected" chip output applied to a corresponding data bus (DBi) line. The raw Di output and an externally generated XIi input signal [i.e. where XIi is the XO(i−1) output of a preceding chip] are applied to the two inputs of an Exclusive-OR gate G4i to produce a signal (XOi) which indicates the parity of the combination of XIi and Di.

As metioned, OG1i indicates whether or not a parity error exists in an internal word. The information present at OG1i is written into array 28 by means of a network 30 which includes an inverter I31, a two-input NAND gate N31 and two insulated-gate field-effect transistors (IGFETs) P1 and N1. OG1i is applied to one input of gate N31 while a control signal (CT1) generated by a microprocessor or other source (not shown) is applied to the other input of N31 and to the input of inverter I31. The output OI31 of I31 is applied to the gate electrode N1 and the output ON31 of N31 is applied to the gate electrode of P1. The source-drain path of P1 is connected between a source of $V_{DD}$ volts and line 29L and the source-drain path of N1 is connected between line 29L and ground. Transistors N1 and P1 are relatively large devices capable, when turned-on, of clamping line 29L to ground or $V_{DD}$, respectively, via a relatively low impedance.

Circuitry needed to write information into memory 8 and parity array 14 is shown separately in FIG. 1c to simplify the drawings.

Referring to FIG. 1c, when a new data bit Ii is to be written into the memory 8 a decoder 107 is first energized in response to a logical product signal CS·WE (where CS=chip select and WE=write enable) from a microprocessor or other source (not shown). Decoder 107 has 5 address inputs (A9 through A13) and 32 outputs. Each one of the 32 outputs is connected to a different write amplifier (WAj). The write amplifiers are connected at their inputs to an input signal line and at their outputs to a bit line BLj. They are, preferably, low output impedance tri-state devices capable of overriding and overwriting the information on their associated bit lines. In response to any selected 5 bit address (A9 through $A_{13}$) applied to its inputs decoder 107 enables one of the write amplifiers called for by that address.

It should be noted that during a write cycle (in fact, just before a new bit is actually written into a memory location) a read is performed. That is an internal word called for by addresses $A_0$-$A_6$ and $A_7$-$A_8$ is read-out onto the bit lines (BLj). The selected write amplifier in response to Ii writes over the information read-out on its associated bit line. The information on the 32 bit lines thus includes 31 old bits of information and one new bit of information.

Consequently, when a new data bit is being written into a chip, the data bit written becomes part of an "internal" word. The "new" internal word is coupled via the SAj amplifiers to parity generator 21. A new parity bit corresponding to the parity of the "new" internal word is generated at the output O21 of parity generator 21 which is the same parity generator 21, used during the read cycle. The "new" parity bit Zg at the output of generator 21 is applied via a write amplifier WAp onto line 16L and is then written and stored in a given location of parity array 14 corresponding to the location of the selected internal word. Note that WAp is controlled by the CS·WE signal, whereby WAp is on regardless of which WAj amplifier is selected by decoder 107.

It is assumed that the RAM array 8 is organized into internal words, each having a length of 32 bits and that corresponding to each internal word there is a parity bit stored in array 14. Whenever a particular data bit location is addressed and its bit is to be read-out, the 32 bit internal word in which the particular data bit is contained is read-out and is applied to the inputs of a parity generator 21. The output Zg of the parity generator 21 indicative of the parity of the internal word is applied to X-OR gate G1i. The parity bit Zp stored in array 14 corresponding to the 32 bit internal word is also read-out and is applied to the other input of gate G1i.

Concurrently, the 32-bit internal word is further decoded in decoder 20 to produce at the output of 20 the particular "raw" data bit (Di) corresponding to the 14 address bits applied to the system. The output, OG1i, of G1i indicates whether parity is correct. As shown in table 1 below, if OG1i is a logic "zero", there is no parity error in the "internal" 32-bit word read-out of the memory. If OG1i is a "1", there is a parity error in the "internal" word read-out of the memory. OG1i indicates the status of the parity of the "internal" word at the chip or subsystem level. Therefore OG1i functions as an error flag indicating whether an error exists in one of 33 bits, where the 33 bits include the 32 bits of the "internal" word read-out and its corresponding parity bit.

TABLE 1

| $Z_g$ | $Z_p$ | OG1i | |
|---|---|---|---|
| 0 | 0 | 0 | Match - No Error |
| 1 | 0 | 1 | Error |
| 0 | 1 | 1 | Error |
| 1 | 1 | 0 | Match - No Error |

OG1i is applied to one input of OR gate 34 and to one input of NAND gate N31.

As noted above, if OG1i indicates the presence of an error, there is no mechanism for (immediately) correcting the faulty bit in the internal word. If subsequently a "new" data bit is written into the faulty internal word, a new parity bit will be generated and stored in parity array 14. When the "new" data bit is then read-out the error flag OG1i will indicate no error when in fact the error may still be present in the internal word. In the present system, such an error continues to be indicated. It is stored in array 28 and its operation and the operation of the associated write and read networks are now detailed.

The type of information written into array 28 is determined by control signal CT1 and the output OG1i. When CT1 is low, OI31 is high and N1 is turned-on clamping line 29L to ground. Concurrently, when CT1 is low, (regardless of whether OG1i is high or low) ON31 is high maintaining P1 turned-off.

When CT1 is low, the signal O29 on line 29L is low; every bit location in memory array 28 can be addressed, via word lines W1 through W128 and column conductors $C_A$, $C_B$, $C_C$ and $C_D$, and a "0" written into each bit location. The all "0" condition of array 28 corresponds to the initial condition to which array 28 is set and also indicates the absence of any error in array 8. Following the initializing of latch array 28, CT1 is driven high. The output of I31 then goes low maintaining N1 turned-off. Since N1 is turned-off, line 29L cannot be driven to the zero volt or "0" condition and "0's" can no longer be written into array 28; (i.e. only "1'S" can be written into memory 28).

CT1-high applied to one input of gate N31 causes the latter to function as an inverter with respect to the OG1i signal. When OG1i is low—indicating that there is no parity error in the internal word addressed by the memory system (i.e. a match exists between Zp and Zg)—ON31 is high and P1 remains turned-off. Concurrently, OI31 is also low and N1 is also turned-off. Hence, P1 and N1 are turned-off and appear as very high impedances connected between line 29L and their respective power lines. Due to the high impedances of P1 and N1, the voltage on line 29L is determined by the condition of the addressed memory cell of array 28. Any addressed storage element is array 28 will then remain in the previously written "0" (or "1") condition.

When OG1i goes high—indicative of a parity error—ON31 is driven low and P1 is turned-on clamping line 29L to $V_{DD}$ volts or "high". The bit location in array 28 corresponding to the selected "internal" word in array 8 will then be written to the high or "1" state. Once written to the "1" state, the storage element remains high until CT1 is again driven low. Barring the generation of a CT1-low signal, a bit location in array 28 once written high remains high. The condition of line 29L for the different possible values of CT1 and OG1i is summarized in Table 2 below.

TABLE 2

| CT1 | OG1i | P1 | N1 | 29L |
|---|---|---|---|---|
| LO | HI | OFF | ON | Active LO |
| LO | LO | OFF | ON | Active LO |
| HI | LO | OFF | OFF | Floating |
| HI | HI | ON | OFF | Active HI |

The role of array 28, during a read cycle, after a "1" has been written in a bit location of array 28 is now examined.

On a subsequent read cycle, if a once faulty internal word of array 8 is again addressed, the "1" stored in a corresponding bit location in array 28 is addressed and produced on line 29L. It is then sensed via amplifier 32i and applied to one input of OR gate 34i. The output of gate 34i thus indicates the existence of a present or past error whenever a faulty or once faulty internal word is selected.

Thus, once an error has been detected in an internal word, there is an error flag stored in array 28 which will be produced whenever that internal word location is addressed. The error indication will persist until the system is cleared by driving CT1 low and cycling through the addresses of array 28. After an error in an internal word is detected ans stored in array 28 a new data bit may be written into the previously faulty internal word, and a new parity bit corresponding t the "new" internal word is generated and stored in parity section 14. Assuming that no error creeps into the new internal word and/or the associated parity bit, the parity for the new word will be correct (OG1$i$=0). But, assuming the error previously detected in this word has not been corrected, there is still an error in the word even though the parity checker (21 and G1$i$) says that parity is correct. This error is indicated in the present system by the output (034$i$) of OR gate 34 which is high.

034$i$ and a system error indicator signal (SP)—whose generation is described below—are applied to AND gate G2$i$. When SP is high ("1") it indicates that there is a parity error associated with a system data word. When SP is low ("0") the parity of the system data word is correct. Therefore, output OG2$i$ of G2$i$ indicates whether or not there exists a system error *and* a subsystem error as set forth in Table 3 below.

TABLE 3

| Subsystem Parity-OG1$i$ | | System Parity-(SP) | | OG2$i$ |
|---|---|---|---|---|
| "1" | (Subsystem Error) | "1" | (System Error) | "1" System and Subsystem Error |
| "1" | (Subsystem Error) | "0" | (No System Error) | 0 |
| "0" | (No Subsystem Error) | "1" | (System Error) | 0 |
| "0" | (No Subsystem Error) | "0" | (No System Error) | 0 |

When OG2$i$ is high ("1") it indicates that a system error exists *and* that a subsystem error exists. The error is a 32 bit internal word indicated by 034$i$ being high is narrowed down or localized to a particular data bit since SP is also high. This conclusion is based on the assumption that there is only a single error in an internal word and/or a single error in a data-word. Since the particular error bit has been located its correction can be effectuated as described below.

When 034$i$ is high and SP is low, there is an error in an internal 32-bit word read-out of the chip but there is no error in the particular data bit Di being read-out of that chip. Likewise when 034$i$ is low and SP is high, there is an error at the system level but the particular 32-bit "internal" word read-out of the chip (or subsystem) is not in error.

Returning to the condition when 034$i$ is high, since a particular error bit has been located it can be corrected. This is achieved by applying Di and OG2$i$ to the two inputs of Exclusive-OR gate G3$i$ to produce an output Oi. As noted in Table 4 below, when OG2$i$ is high Oi is made the inverse of Di. Therefore, a single error in the system is corrected. That is, Oi becomes the corrected version of Di. When OG2$i$ is low, Oi is equal to Di. That is, the binary value of the data bit Di at the output of decoder 20 is applied to its corresponding data bus (DBi).

TABLE 4

| Di | OG2$i$ | Oi | |
|---|---|---|---|
| 0 | 1 | 1 | } Oi = $\overline{Di}$ |
| 1 | 1 | 0 | |
| 0 | 0 | 0 | } Oi = Di |
| 1 | 0 | 1 | |

Consider the case where an internal word is read containing a parity error, and an error indication is then produced and stored in array 28. Assume that subsequently a new bit is written into that internal word resulting in a "new" internal word and in a new parity bit being generated and stored in array 14. During a subsequent read cycle the "new" internal word and the "new" parity bit are read-out and OG1$i$ is low indicating no error in that internal word. However, concurrent with the read-out of the new internal word is the read-out of the corresponding parity bit error indicator located in array 28. The error indicator produces a high at the output of OR gate 34$i$ and if the system parity signal also indicates the presence of an error, a "corrected" bit is produced at the Oi output of the chip. Thus, even though OG1$i$ indicates no error, a faulty bit can still be corrected.

The circuitry shown in FIGS. 1$a$, 1$b$ and 1$c$ is preferably formed on a single integrated monolithic circuit. Integrated circuits or modules each incorporating the circuitry shown in FIGS. 1$a$, 1$b$ and 1$c$ may be interconnected to form a large memory system as shown in FIG. 3.

Figure 3:
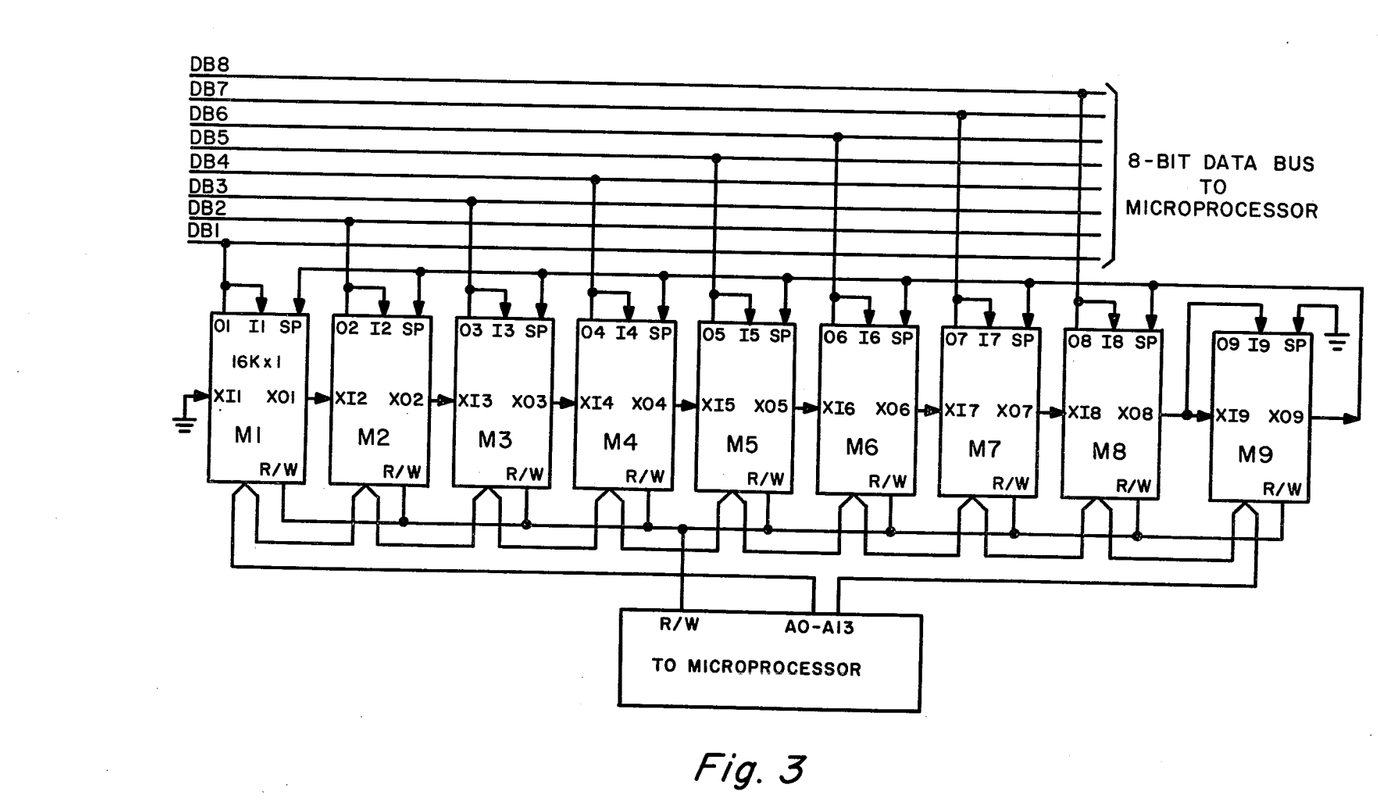
FIG. 3 is a block diagram of a memory system embodying the invention.

FIG. 3 is a block diagram of a fault tolerant 16K×8 (actually 16,384×8) memory system comprised of 8 memory chips (M1 through M8) and a "system parity" memory chip M9. The 9 chips (M1–M9) are identical to each other, each including the circuitry shown in FIGS. 1$a$, 1$b$, and 1$c$. Each chip (Mi) includes: a data input (Ii) pin for the application of input data to be written into and stored by the memory chip; a data output (Oi) pin at which is produced or read-out a selected and, if necessary, "corected" data bit stored within the memory; an (XIi) input pin for the application to the chip of a signal XO(i−1) indicative of the parity of the data bit(s) of the preceding (i.e. lower numbered) chip(s); an (XOi) output pin at which is produced a signal indicative of the parity of the "raw" data bit of the chip in combination with the parity of the data bits of all preceding chips; a system parity (SP) input pin to which is applied a system parity signal indicating whether or not a "system" parity error exists. [The reference character i is a variable corresponding to the number of the chip.] Each chip also includes a read/write(R/W) control pin whose applied signal determines whether a read or a write operation is to occur; and 14 address inputs (i.e. A$_0$ through A$_{13}$) to enable the ultimate selection (or addressing) of a single bit location out of the 16,384 possible bit locations. The system parity signal is generated by comparing the parity of the 8 "raw" data bits read-out of chips M1 through M8 with a corresponding parity bit stored in system parity chip M9. To simplify the illustration, certain pins (e.g. V$_{DD}$, ground) although present on each chip and needed for its operation are not shown.

In the system of FIG. 3, the output (Oi) pin of each of chips M1 through M8 is connected to its Input (Ii) pin and to a corresponding data bit (DBi) line. The data bit lines, DB1 through DB8, form an 8 bit data bus which couples the memory system to a microprocessor (not shown). Except for the last chip, the XOi output of chip Mi is connected to the XI(i+1) input of chip M(i+1). The XI1 input of chip M1 is grounded ("0" level input). The XI9 input of chip M9 is connected to its input (I9) pin. The output (O9) pin of M9 is not connected to any data bus. The XO9 output of chip M9 is connected to the SP input of chips M1 through M8. The SP input of M9 is grounded ("0" level input). The XO pin of one chip is connected to the XI pin of the next chip in an arrangement, referred to herein as a "daisy chain" interconnection, to produce a system parity signal.

During a write cycle, concurrent with the writing of a data bit Ii into a chip Mi, the information on the other 7 data bus lines (DB) will be similarly written (if new) or rewritten (if old) in the corresponding bit locations of their arrays. [During a write cycle Ii=Di=Oi]. Hence a "new" system data word will be written into the memory system.

Figure 4:
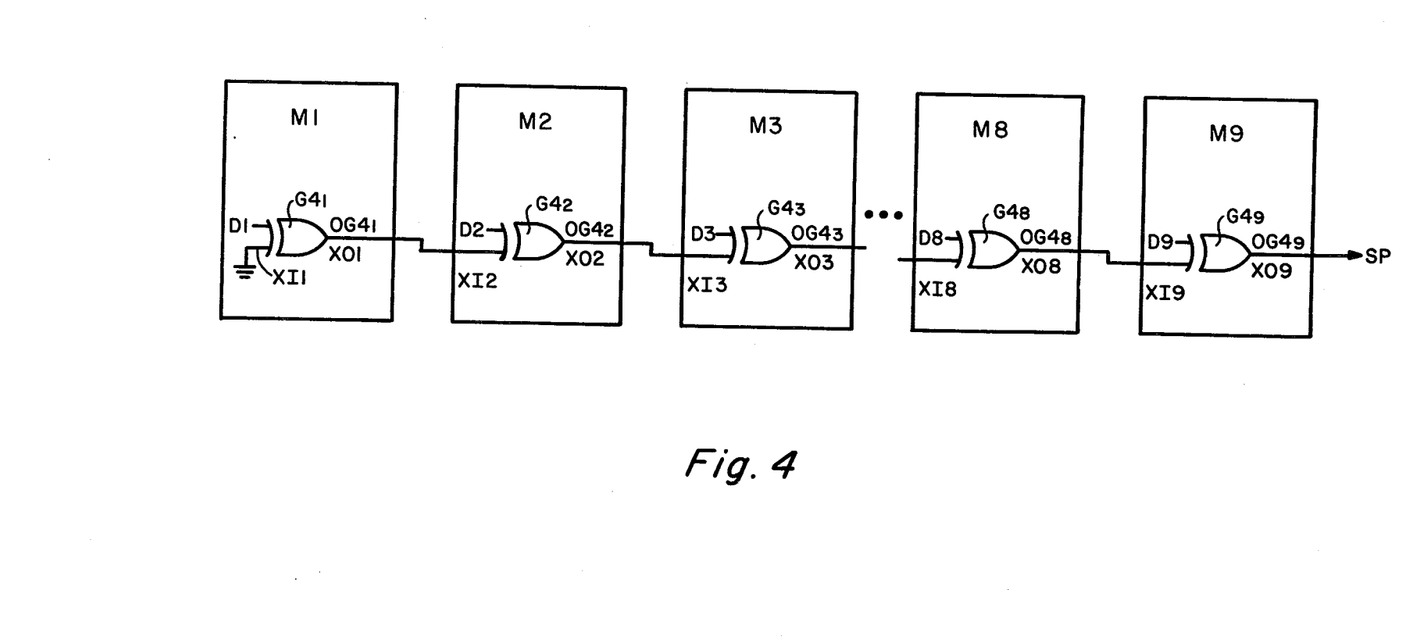
FIG. 4 is a portion of the system of FIG. 3.

When a "new" system data word is written into the memory system, a system parity bit corresponding to the system data word is generated and stored in a given location of memory M9. By way of example, the 8 bit data word (D1 through D8) appearing on the 8 bit data bus line (DB1 through DB8) is applied to the corresponding inputs (Ii) of the 8 memory storage chips (M1–M8), all of which are energized by chip select and write enable signals. Since the same addresses are applied to all the chips of the system, the 8 bits of the system data word are written into corresponding bit locations of memory chips M1 through M8. The parity of the 8 bits of the system data word is generated (using gates G4i of each chip as shown in FIG. 4) and written into a corresponding bit location of system parity chip M9.

The generation of the system parity signal (SP) is best explained by reference to FIG. 4 which shows the "daisy-chain" interconnection of the Exclusive-OR gates G4i located on each chip. Each gate G4i has two inputs Di and XIi; where Di is the raw data bit read-out of the chip and XIi is the XO(i−1) output of the preceding chip [except for the first chip (M1) of the system]. So connected the XOi output of each chip indicates the parity of the data bit (Di) of the present chip combined with the parity of the raw data bit(s) outputted from preceding chips. Thus, during a read cycle the output OG48 (XO8) from G48 will be "low" if there is an even number of "one's" in the data word (D1 through D8) and OG48 wil be "high" if there is an odd number of "one's" in the data word. Recall, that during a write cycle the parity of the data word written into a particular bit location in each of the 8 memory chips (M1–M8) is sensed and a parity bit equal (of some binary value) to the parity of the 8 data bits is generated and stored in a corresponding bit location of system parity chip M9. Thus, during a read cycle the output OG48 (XO8) should match the output D9 from M9 and the XO9 output from G39 also designated as the SP signal should be a logic "zero", if there is no error in the data word (D1 through D8) and/or D9. Lack of match between XO8 and D9 (indicative of an error in the data word and/or the stored system parity bit) results in the SP signal being a "1" or high level. Thus, as mentioned above, the SP signal functions as the second levle parity error detector, and may be used to correct errors.

As discussed above, the output XO9 of G49 is applied simultaneously to the system parity input (SP) of the main memory chips M1 through M8. The coincidence of a second-level parity error signal with an internal (subsystem) parity error signal results in the correction of the faulty data bit high generated in the offending subsystem. As noted above, the correction occurs by means of logic gates G1i, G2i, and G3i.

The latching array may be used in any suitable system which could be other systems then the one shown in FIG. 3. Also, the latching array can be configured in any size from a single bit to the equivalent of a full parity array in order to trade off the desired chip efficiency versus survivability. Each bit in this latching array will correspond to a segment of the memory array which in effect will be removed from service when it is found to contain an error. The latching array information is not reversible during normal memory operation. Once it detects the presence of an error it will continue to flag that error even if the error is erased during a subsequent write cycle. However, a power-up reset generator like circuit 30 may be included in the scheme to both initialize the memory, parity, and latching arrays when the memory chip is first turned-on and to allow revitalization of the memory when, through a hardware or software technique, a set threshold of chip errors has been passed and only soft errors are present. The reset generator can consist essentially of any power-up detector circuit and counters which cycle the arrays through all of their addresses while writing in some predetermined initial state.

What is claimed is:

1. In a memory system including a random access memory array (RAM) organized so that bits are read-out internally a group at a time and where the parity of each such group of bits read-out internally is checked and where there is selected for external read-out from any group of internally read-out bits, a sub-group of less than all of the bits in said group and where less than a whole group of new data bits is written into the memory at any one time, and each time a new data bit is written into a group a new parity bit is generated for that group whereby an error originally present within the group of bits may be masked, the improvement comprising:

means for sensing the presence of a parity error in any one of said group of bits being read-out internally when its parity is checked and for producing an error signal corresponding to each group of bits having a parity error; and     means for storing each error signal and for subsequently producing, until said means for storing is reset, a parity error signal indication each time a group of bits, corresponding to which an error signal was one produced, is read out.

2. The improvement as claimed in claim 1 wherein said means for sensing the presence of an error includes a parity checker coupled to said RAM for producing said error signal indicating whether the parity of the bits of a group is in error, and wherein said means for storing comprises a memory array.

3. In the memory system as claimed in claim 1 wherein said memory array and said means for sensing the presence of an error and then storing that error are formed on the same integrated circuit.

4. In the memory system is claimed in claim 3 wherein said means for storing an error includes a latch array having a bit location corresponding to each one of said group of bits of said memory array.

5. A memory module comprising:

a memory array of R·C memory cells partitioned internally into W internal words of L bits and organized externally as a memory of X words by Y bits, where L is greater than Y and R·C=W·L=X·Y; and where R, C, W, L, X and Y are integers;

means for reading-out a selected Y bits and for concurrently reading the internal word in which the selected Y bits are included;

a parity array for storing a parity bit corresponding to each internal word;

parity check means receptive of a selected internal word and its corresponding parity bit for ascertaining whether its parity is correct and for producing a first signal indicative thereof;

parity error storing means, coupled to said parity check means, having W bit locations, one bit location per internal word, each one of said bit locations of said parity error storing means for permanently storing the occurrence of a parity error in its corresponding internal word; and means, coupled to said parity error storing means for subsequently producing a parity error signal indication each time an internal words is selected whose corresponding bit location in said parity error storing means is storing the previous occurrence of a parity error.

6. The memory module as claimed in claim 5 wherein said parity error storing means is an array of storage elements containing one storage element corresponding to each internal word;

each storage element normally storing a no error signal condition and being settable to an error signal storing condition when the first signal of its corresponding internal word indicates the presence of a parity error in that internal word.

7. An integrated circuit suitable for use in a memory system comprising:

a random access memory (RAM) array having R·C bit locations arranged in R rows and C columns, said RAM being organized into W "internal" words of L bits each; where W·L is equal to R·C and where R, C, W and L are digits greater than 1;

a parity array section of W bits for storing a parity bit for each one of said W "internal" words of said RAM;

decoding means coupled to said RAM for selectively reading one of said "internal" words and for concurrently reading-out a data bit out of the L bits of said selected one of said internal words;

parity checking means, coupled to said decoding means and to said parity array responsive to the parity of the L bits of the selected internal word and to its parity bit for producing a first level output signal having a first value to indicate the absence of a match (error) between the parity of the L bits and the stored parity bit and having a second value to indicate the presence of a match (no error);

a latching array having "N" bit locations where N is an integer equal to or greater than 1, each bit location normally storing one binary value indicating no error and being settable to the other binary condition indicative of error; and means coupled between said parity checking means and said latching array receptive of said first level output setting a bit location in said latching array to said other binary condition when said first level output signal indicates the absence of a match (error).

8. The combination as claimed in claim 7 wherein said latching array includes W bit locations, one location for each one of said W internal words.

9. The combination as claimed in claim 8 wherein said latching array includes a static storage cell at each one of its W bit locations.

10. The combination as claimed in claim 9 wherein each one of said static storage cells of said latching array once set to a condition indicative of the absence of a match remains set to that condition.

11. A memory system comprising, in combination:

a memory array for storing groups of information bits and their parity bits;

means responsive to an address for reading from the memory array a selected group of said bits, said group containing information bits having a bit of interest, and a parity bit;

means for checking the parity of the selected group of said bits and if there is an error, producing and storing an error bit;

means responsive to an address for writing a bit into said array, in a selected bit position in said array, said selected bit position being within a particular group of bits in said array;

means for generating a new parity bit for each group of bits each time a bit is written into a bit position of that group of bits for storing that new parity bit in said memory array, whereby whether or not there is an error in a group of bits in a bit position other than the one into which a bit is written, the new parity bit will indicate that the parity for that group of bits is correct whereas there may be an error in said group of bits; and means responsive to the detection of an error in a particular bit position of a selected group of bits read from said memory array and to a stored error bit for that selected group of bits, for automatically correcting said error.

* * * * *

UNITED STATES PATENT AND TRADEMARK OFFICE
CERTIFICATE OF CORRECTION

PATENT NO.   :   4,472,805
DATED        :   September 18. 1984
INVENTOR(S)  :   Ihor Taras Wacyk et al.

It is certified that error appears in the above-identified patent and that said Letters Patent is hereby corrected as shown below:

Col. 1, line 56, change "FIGS." to --- FIG. ---.
Col. 2, line 13, change "IM2" to --- Im2 ---.
Col. 3, line 22, change "coresponding" to --- corresponding ---.
Col. 3, line 35, change "imput" to --- input ---.
Col. 3, line 48, change "into" to --- onto ---.
Col. 4, line 2, change "duct" to --- data ---.
Col. 5, line 13, after "bit" insert --- being ---.
Col. 7, line 9, change "ans" to --- and ---.
Col. 7, line 11, change "t" to --- to ---.
Col. 8, line 43, change "corected" to --- corrected ---.
Col. 9, line 50, change "wil" to --- will ---.
Col. 9, line 65, change "levle" to --- level ---.
Col. 10, line 4, change "high" to --- being ---.
Col. 10, line 64, change "is" to --- as ---.

Signed and Sealed this

Twenty-first Day of May 1985

[SEAL]

Attest:

DONALD J. QUIGG

Attesting Officer         Acting Commissioner of Patents and Trademarks